US011692652B1

(12) United States Patent
Dias et al.

(10) Patent No.: US 11,692,652 B1
(45) Date of Patent: Jul. 4, 2023

(54) PRESS FITTING DEVICE, COMPONENTS AND METHOD

(71) Applicant: Quick Fitting Holding Company, LLC, East Providence, RI (US)

(72) Inventors: Libardo Ochoa Dias, West Warwick, RI (US); Herbert J. Bouchard, West Greenwich, RI (US)

(73) Assignee: Quick Fitting Holding Company, LLC, East Providence, RI (US)

( * ) Notice: Subject to any disclaimer, the term of this patent is extended or adjusted under 35 U.S.C. 154(b) by 0 days.

(21) Appl. No.: 17/742,730

(22) Filed: May 12, 2022

(51) Int. Cl.
*F16L 17/02* (2006.01)
*F16L 13/14* (2006.01)

(52) U.S. Cl.
CPC ............. *F16L 17/02* (2013.01); *F16L 13/142* (2013.01); *F16L 2201/10* (2013.01)

(58) Field of Classification Search
CPC ....... F16L 17/02; F16L 17/025; F16L 17/032; F16L 13/142; F16L 2201/10; F16L 21/02; F16L 21/03; F16L 37/0885; F16L 17/10; F16L 23/167; F16L 2201/30
See application file for complete search history.

(56) References Cited

U.S. PATENT DOCUMENTS

| | | | | | |
|---|---|---|---|---|---|
| 2,099,722 | A | * | 11/1937 | Byers ...................... | F16L 17/10 285/374 |
| 3,149,861 | A | * | 9/1964 | Gunnar .................. | F16L 13/142 29/451 |
| 3,944,263 | A | * | 3/1976 | Arnold ..................... | F16L 17/10 285/308 |
| 4,830,408 | A | * | 5/1989 | Reimert .............. | F16L 37/0885 285/308 |
| 5,160,175 | A | * | 11/1992 | Yang ........................ | F16L 17/10 285/104 |
| 5,484,174 | A | * | 1/1996 | Gotoh ................... | F16L 13/142 29/508 |
| 5,671,955 | A | * | 9/1997 | Shumway ........... | F16L 37/0885 285/305 |

(Continued)

FOREIGN PATENT DOCUMENTS

| | | | | |
|---|---|---|---|---|
| DE | 2935085 A1 | * | 3/1981 | ............... F16L 17/02 |
| EP | 2508784 A1 | * | 10/2012 | ............... F16L 17/02 |

(Continued)

OTHER PUBLICATIONS

Anvil International, Anvil Press Grip Technology Press, "Copper Press Fittings", APC-10.18.

(Continued)

*Primary Examiner* — Matthew Troutman
*Assistant Examiner* — Fannie C Kee
(74) *Attorney, Agent, or Firm* — Williams Mullen; Thomas F. Bergert (57) ABSTRACT

A press fitting device, components and method provide one or more indicators to provide a visual indication that the fitting has been properly pressed around a tube and that the correct amount of pressure has been provided to create a permanent seal. In embodiments, a sealing ring is retained within an indentation of a main body component of the fitting and the sealing ring is expandable upon compression to be visible through an opening in the main body component.

18 Claims, 9 Drawing Sheets

(56) References Cited

U.S. PATENT DOCUMENTS

| | | | |
|---|---|---|---|
| 8,888,145 B1 * | 11/2014 | Crompton | F16L 13/142 |
| | | | 285/369 |
| 9,416,897 B2 | 8/2016 | Crompton et al. | |
| 2003/0116965 A1 * | 6/2003 | Hsu | F16L 37/0885 |
| | | | 285/321 |
| 2005/0023824 A1 * | 2/2005 | Breay | F16L 21/02 |
| | | | 285/1 |
| 2011/0204624 A1 * | 8/2011 | Lawrence | F16L 13/142 |
| | | | 285/345 |
| 2013/0167357 A1 * | 7/2013 | Arment | F16L 17/02 |
| | | | 148/684 |
| 2015/0076817 A1 * | 3/2015 | Bizzarrini | F16L 21/03 |
| | | | 285/374 |
| 2017/0130877 A1 * | 5/2017 | Barker | F16L 17/02 |
| 2018/0180203 A1 * | 6/2018 | Yashin | F16L 21/03 |
| 2019/0285206 A1 * | 9/2019 | Alberganti | F16L 13/142 |
| 2021/0220899 A1 * | 7/2021 | Hartmann | F16L 17/025 |
| 2021/0247003 A1 * | 8/2021 | Stogdill | F16L 21/03 |

FOREIGN PATENT DOCUMENTS

| | | | | |
|---|---|---|---|---|
| GB | 2573165 A | * | 10/2019 | F16L 17/02 |
| JP | 3968397 B1 | * | 8/2007 | F16L 17/02 |
| WO | WO-2006135227 A1 | * | 12/2006 | F16L 17/02 |

OTHER PUBLICATIONS

Reliance Worldwide Corporation (Canada)Inc., Sharkbite New Construction System Installation Guide, SharkBite Plumbing Solutions, pp. 1-15.

* cited by examiner

PRESS FITTING DEVICE, COMPONENTS AND METHOD

TECHNICAL FIELD

The present invention relates to fluid flow systems, and more particularly to press fittings with visual indicators for use in fluid flow systems.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, wastewater, plant cooling water and paint and coatings are just some examples of the types of fluids and gases that can be deployed through piping systems. Tubing and piping types can include, for example, copper, stainless steel, CPVC (chlorinated polyvinyl chloride), iron, black iron, ductile iron, gray iron, HDPE (high density polyethylene) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In addition to welding methods, pipe elements have been secured together through pressure. A press fitting, which is also known as a friction fit or an interference fit, is a fastening of parts that takes place through friction after the parts are pushed or compressed together, as opposed to being connected by threads, glue, solder or other methods. Press fittings of fluid flow parts such as plumbing parts can be created by force, through the use of a hand tool, for example. Hand tools, often called press tools, can take the form of a pair of movably engaged jaws similar to a pair of pliers, for example, where the jaws have a head portion of a certain size designed to fit around parts that are to be connected. For instance, a pipe can be inserted into a fitting made of a somewhat compressible material, whereupon pressure can be applied through the press tool to the outside of the fitting in order to compress the fitting around the pipe. It is critical that the press tool be appropriately applied around the entire circumference of the fitting in order to ensure a tight connection. Once connected, the parts can be used for various purposes. In the field of fluid flow, the connected parts can be used to direct the flow of fluids, such as gases, water and other liquids as described above.

Traditional press fittings are frequently improperly sealed or only partially sealed. If an installer has not properly pressed the fitting to provide a permanent seal, fluid can leak, causing great damage and cost. Imperfections or scarring in the tubing being inserted also presents an opportunity for the connection to leak following compression. In many installation environments, installers take work breaks or otherwise become distracted as to which of a number of press fittings have been properly compressed and which have been either improperly compressed or not at all. When this happens, there has been no simple and fast way (other than catastrophic failure or leakage) to determine which fittings have been properly pressed, which can result in lost time spent determining which fittings need to be pressed or have been damaged in the application environment.

Press-fit technology for piping systems with visual indicators can be obtained, for example, through Quick Fitting Holding Company, LLC of Providence, R.I., USA, suppliers of the COPRO®, ProBite®, LocJaw™, BlueHawk™, CopperHead® and Push Connect® lines of push fittings and related products. Also, such technology is described, for example, in U.S. Pat. Nos. 8,888,145 and 9,416,897, the disclosures of which are incorporated herein by reference in their entireties.

SUMMARY

Embodiments of the device of the present disclosure, in part, assist in providing one or more visual indicators to assist an individual in determining whether a piping element such as a fitting has been pressed, and whether the correct amount of force has been applied to create a positive and/or permanent seal. In embodiments of the present disclosure, a fitting is provided having a main body component, with a sealing ring securely maintained, at least in part, against a portion of the interior wall of the main body component. The sealing ring is malleable and expandable when properly compressed so as to extend around an inserted pipe and into one or more windows formed in the main body component. In this way, an installer, inspector or other individual can visually determine very quickly whether a press fitting has been compressed, and whether there is a proper and complete seal. In various embodiments, the sealing ring is formed with a wing and the main body component is formed so as to facilitate the wing extending into the window(s) to facilitate visually assessing when the fitting has been properly compressed.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein: rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to an opening may encompass one or more openings, reference to a sealing ring may encompass one or more sealing rings and so forth. For purposes of the present disclosure, it will be appreciated that a fitting can encompass a valve member and other piping elements including, but not limited to: a coupling joint, an elbow joint, a tee joint, a stop end, a ball valve member, tubing and other objects having cylindrical openings.

As shown in FIGS. 1 through 19, embodiments of the present disclosure provide a fitting 10 having a somewhat cylindrically shaped main body component 20 with an interior surface 14 and an exterior surface 16. The main body component 20 is formed with an axially outer edge 11. In various embodiments, the main body component 20 can be formed (e.g., forged, cast, extruded and/or pressed) in brass, aluminum, steel, malleable iron or copper, with full porting and full flow fitting, for example. FIGS. 1 through 6 and 15 through 19 illustrate embodiments of the main body component 20 with one or more openings 50 formed through and around the periphery of the main body component 20. In various embodiments, such openings 50 can be spaced around the circumference of the main body component 20 at different intervals that are generally axially equidistant from a tube stop 21, and such openings 50 permit a user to view internal components such as a sealing ring 52 upon compression as described elsewhere herein. In various embodiments, the main body component 20 can be formed so as to have a constant radial thickness interrupted by one or more of the openings 50.

Figure 1:
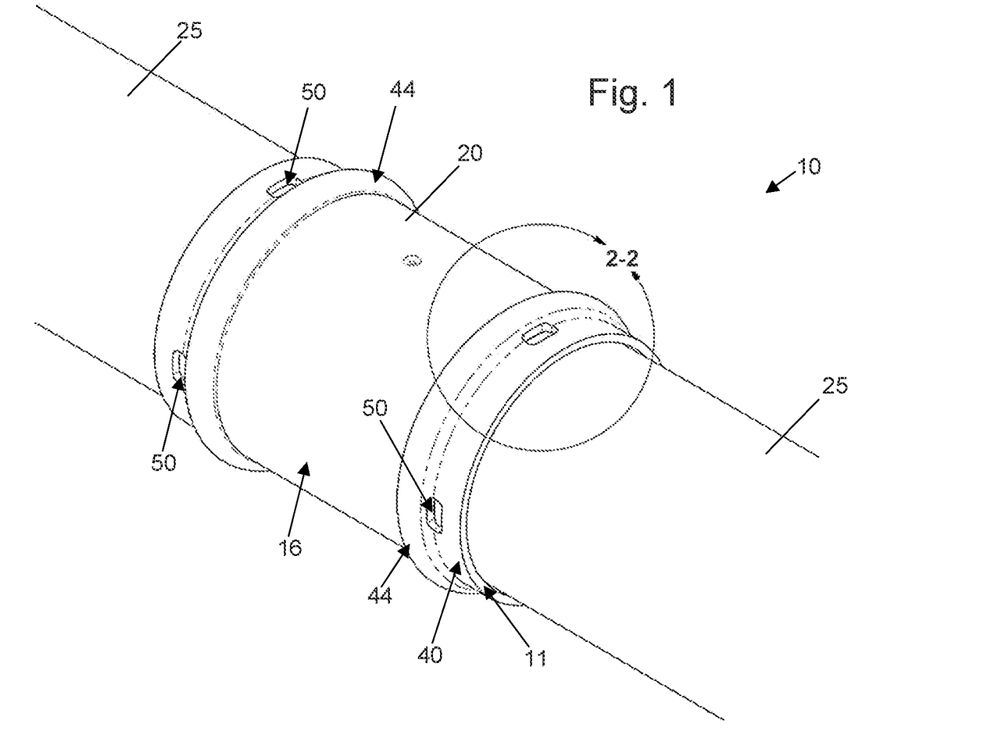
FIG. 1 is a perspective view of a fitting with inserted piping components in accordance with embodiments of the present disclosure.
Figure 2:
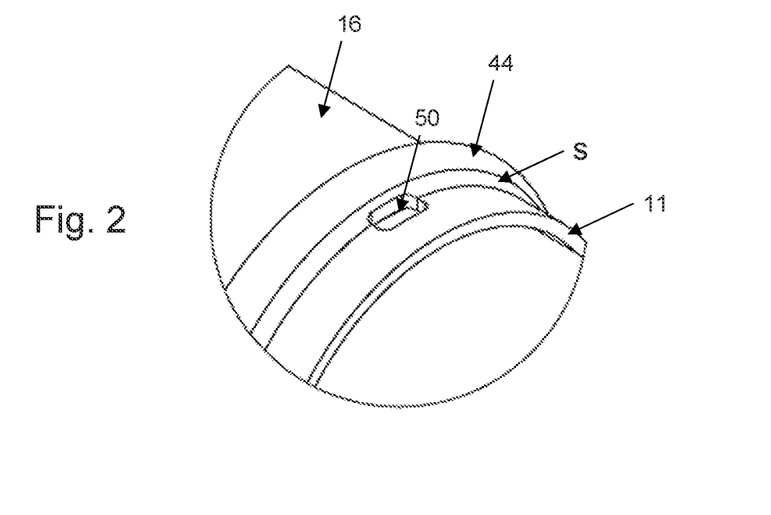
FIG. 2 is a detailed view of encircled portion 2-2 of FIG. 1.
Figure 3:
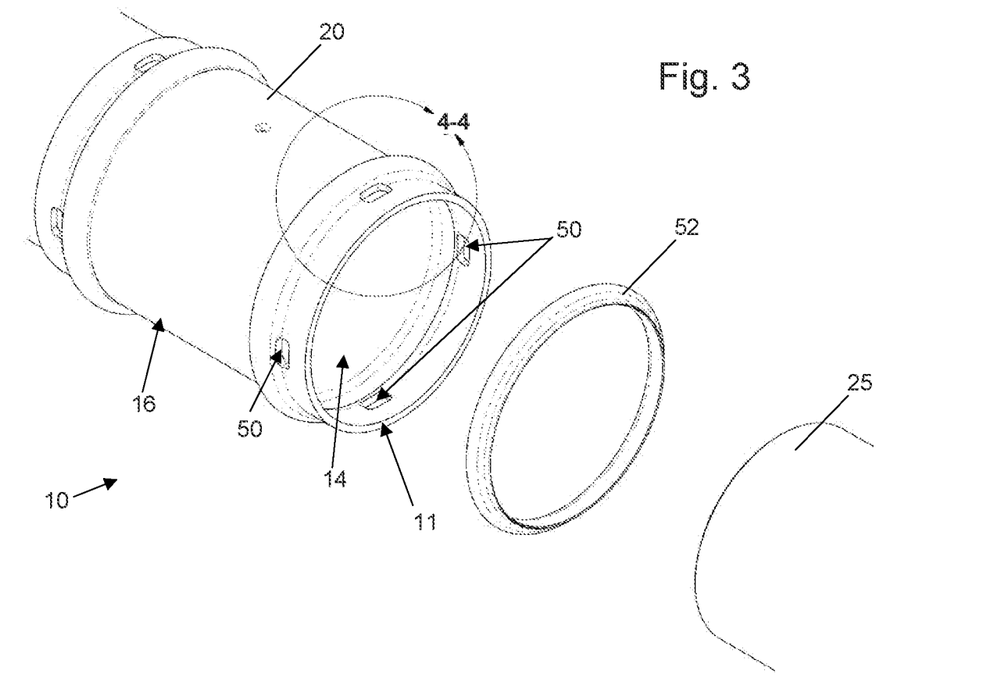
FIG. 3 is an exploded perspective view of a fitting, sealing ring and a piping component to be inserted in accordance with embodiments of the present disclosure.
Figure 4:
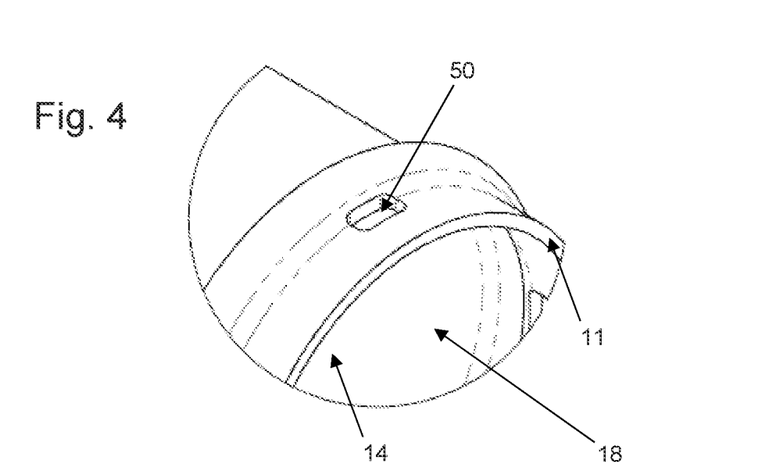
FIG. 4 is a detailed view of encircled portion 4-4 of FIG. 3.
Figure 5:
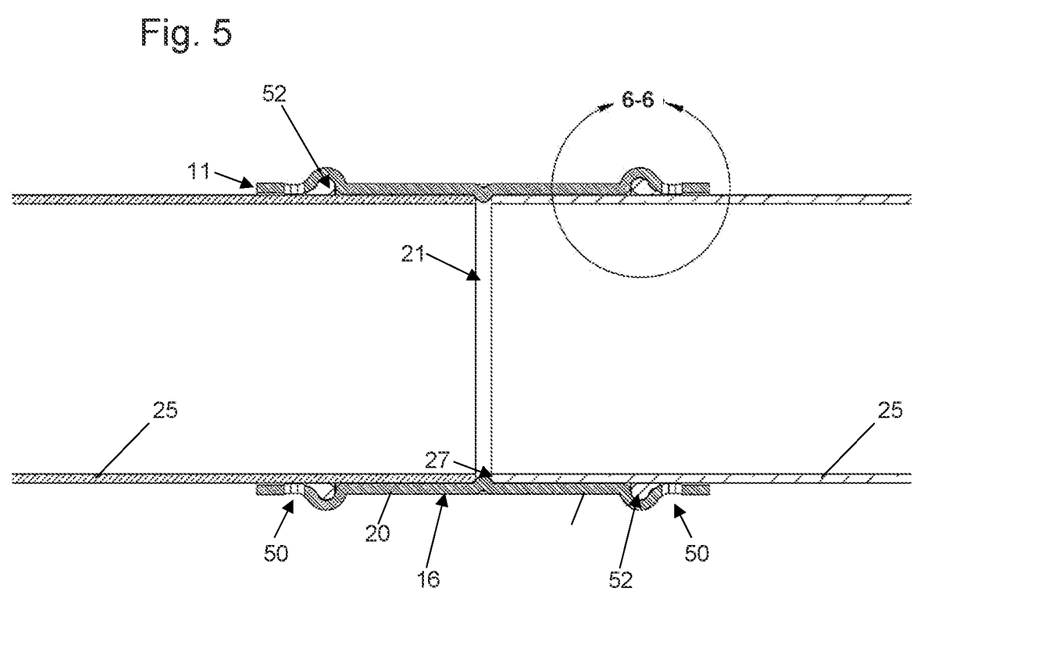
FIG. 5 is a cross-sectional view of a fitting with installed sealing rings and piping components according to embodiments of the present disclosure.
Figure 6:
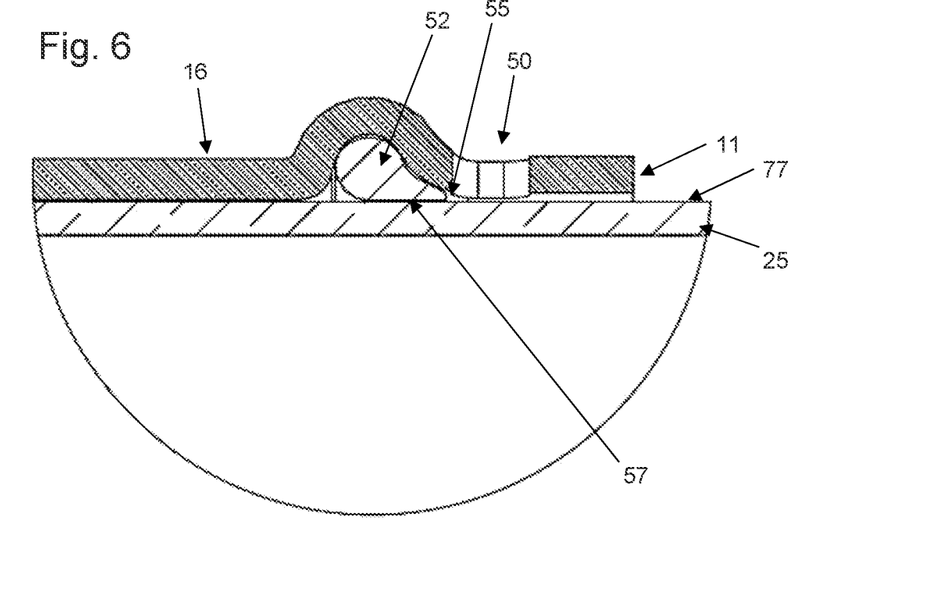
FIG. 6 is a detailed view of encircled portion 6-6 of FIG. 5.
Figure 18:
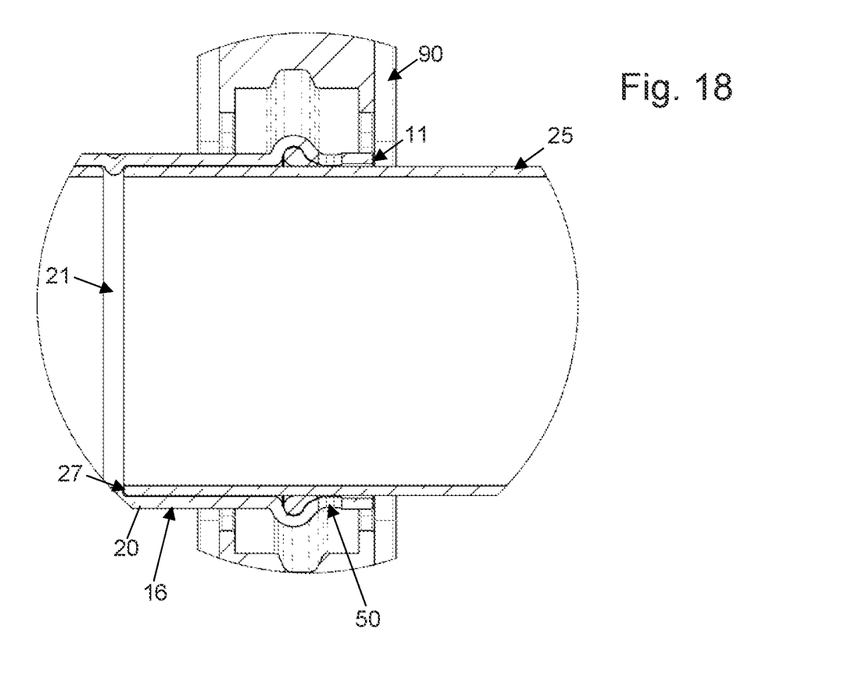
FIG. 18 is a cross-sectional view of a portion of a fitting with pipe inserted and prior to compression by a press tool in accordance with embodiments of the present disclosure.

As further shown in the drawings, the interior surface 14 defines a cavity 18 extending through the main body component 20 along a central axis A, and includes a tube stop 21 extending radially inwardly at the general axial midpoint of the main body component 20. A first compartment 31 extends axially outwardly in one direction from the tube stop 21 and a second compartment 33 extends axially outwardly in another direction from the tube stop 21. The tube stop 21 extends radially inwardly from the interior surface 14, and when a pipe 25 of appropriate diameter is inserted into either compartment 31, 33, the pipe's axial end wall 27 abuts the tube stop 21 as shown in FIGS. 5 and 18 so that the pipe 25 cannot be inserted axially further into main body component 20. It will be appreciated that embodiments of the present disclosure may provide a fitting 10 having only a first compartment 31. Further, it will be appreciated that fittings may be provided with multiple tube stops 21 according to various embodiments of the present disclosure such as, for example, where the main body component 20 is formed as an elbow.

Figure 7:
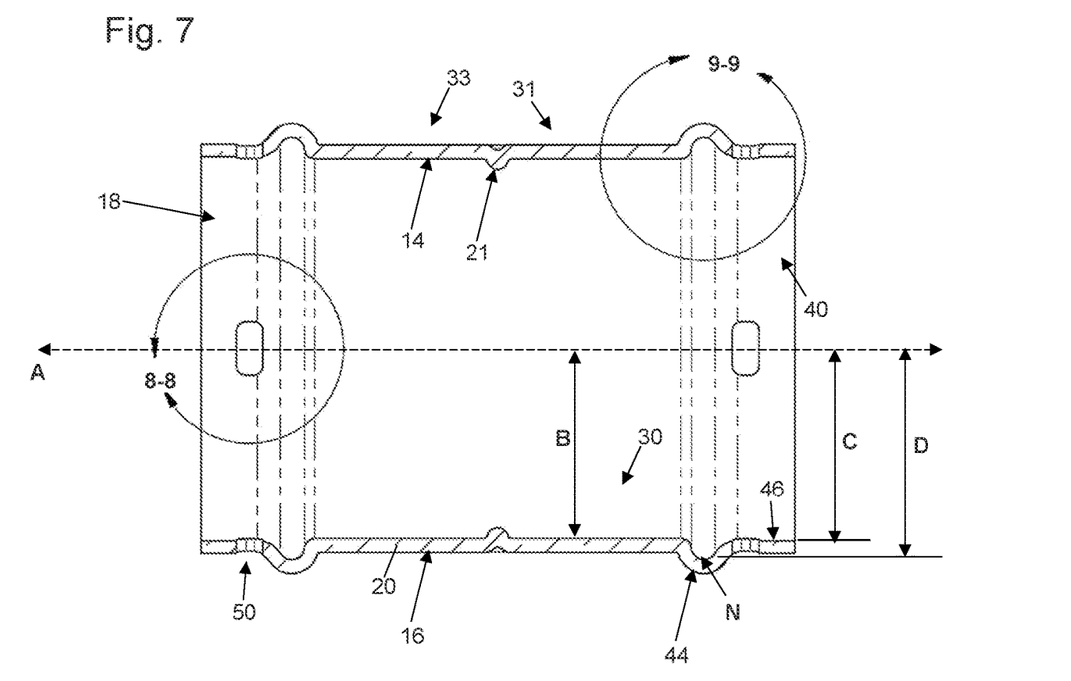
FIG. 7 is a cross-sectional view of a main body component according to embodiments of the present disclosure.
Figure 8:
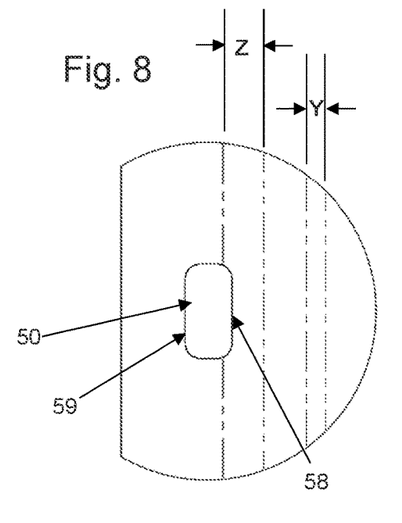
FIG. 8 is a detailed view of encircled portion 8-8 of FIG. 7.
Figure 9:
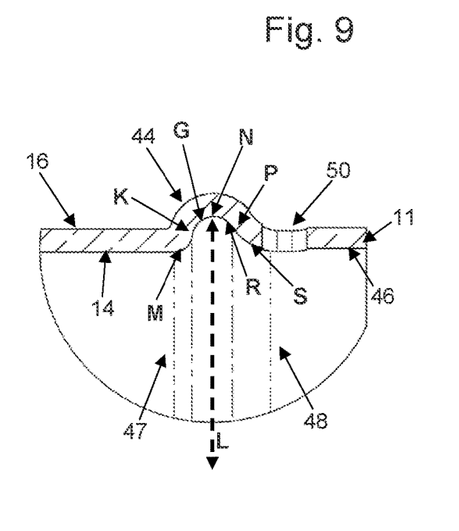
FIG. 9 is a detailed view of encircled portion 9-9 of FIG. 7.
Figures 10, 11:
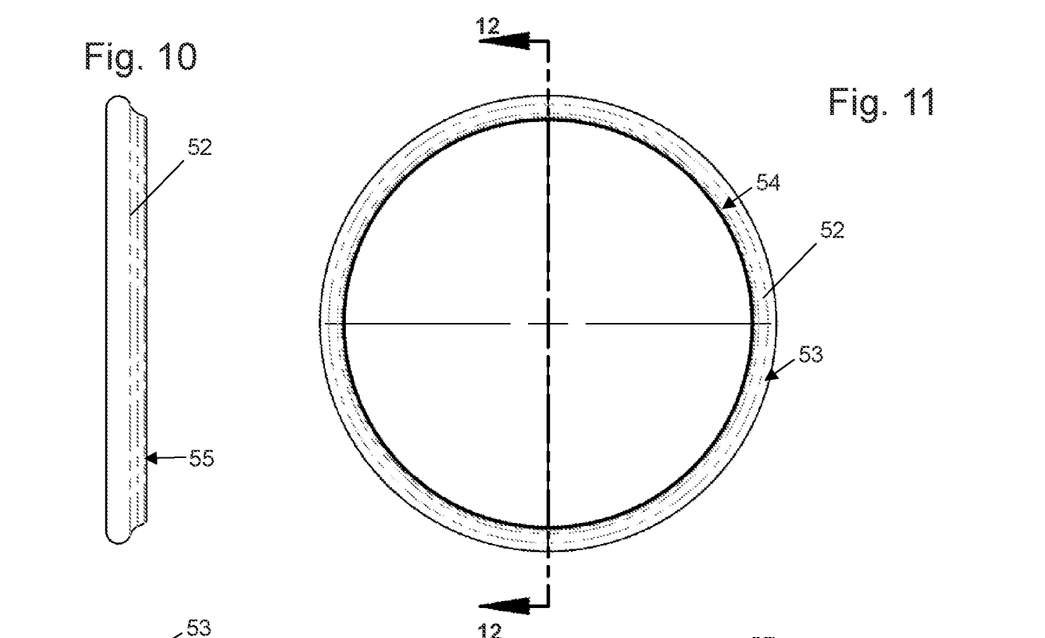
FIG. 10 is a front view of a sealing ring according to embodiments of the present disclosure.
FIG. 11 is a right side view of the sealing ring of FIG. 10.
Figure 12:
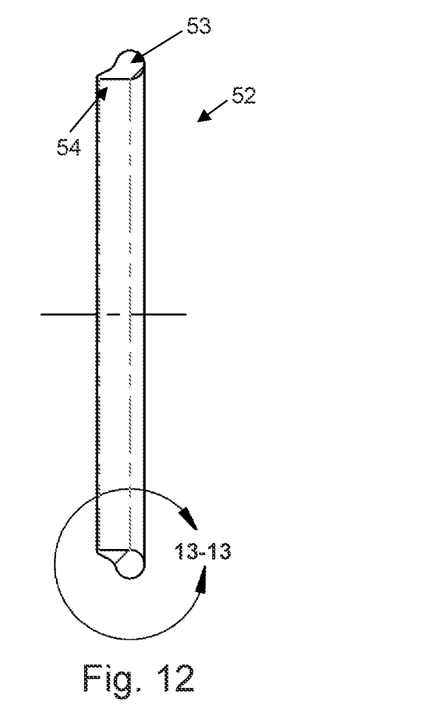
FIG. 12 is a cross-sectional view of the sealing ring taken along line 12-12 of FIG. 11.
Figure 13:
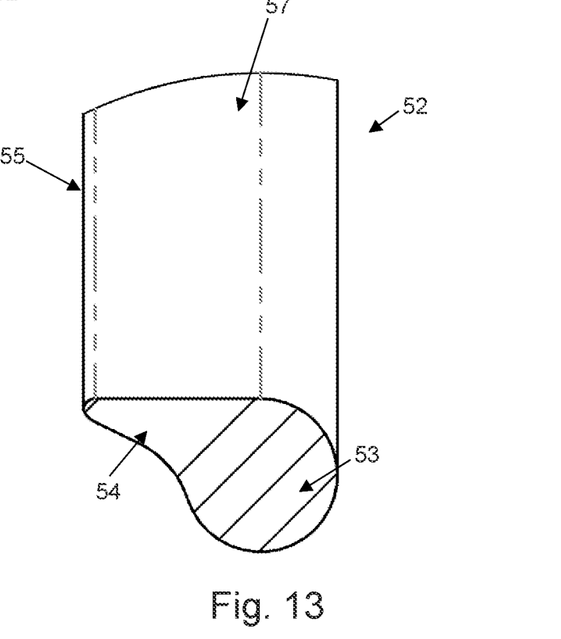
FIG. 13 is a detailed view of encircled portion 13-13 of FIG. 12.
Figure 14:
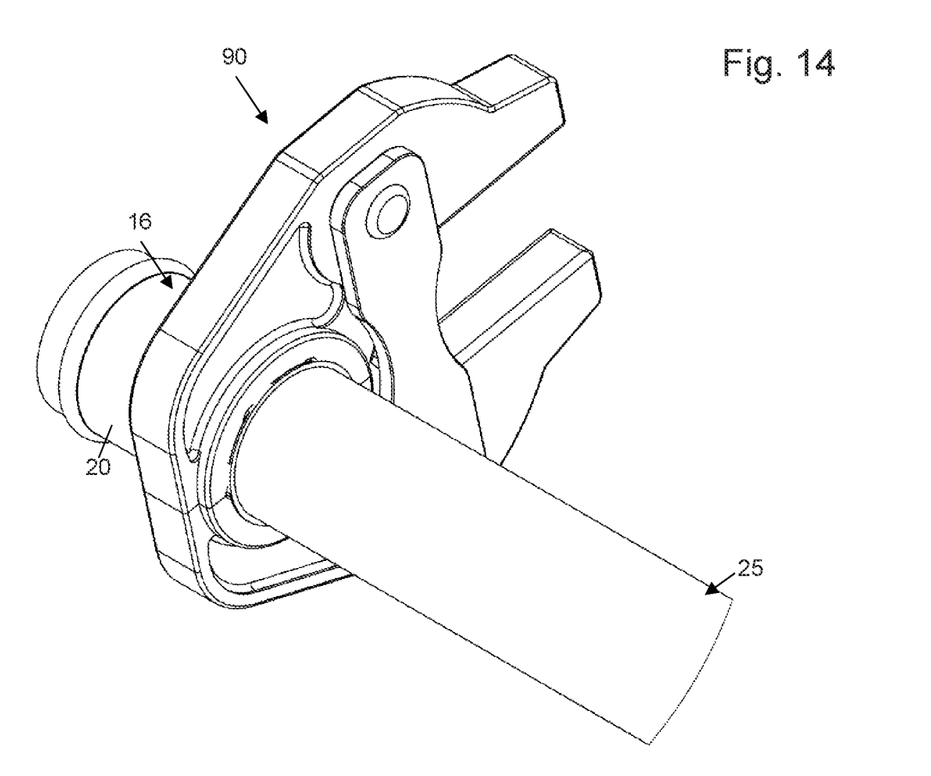
FIG. 14 is a perspective view of a fitting with a pipe inserted and as being compressed by a press tool in accordance with embodiments of the present disclosure.
Figure 15:
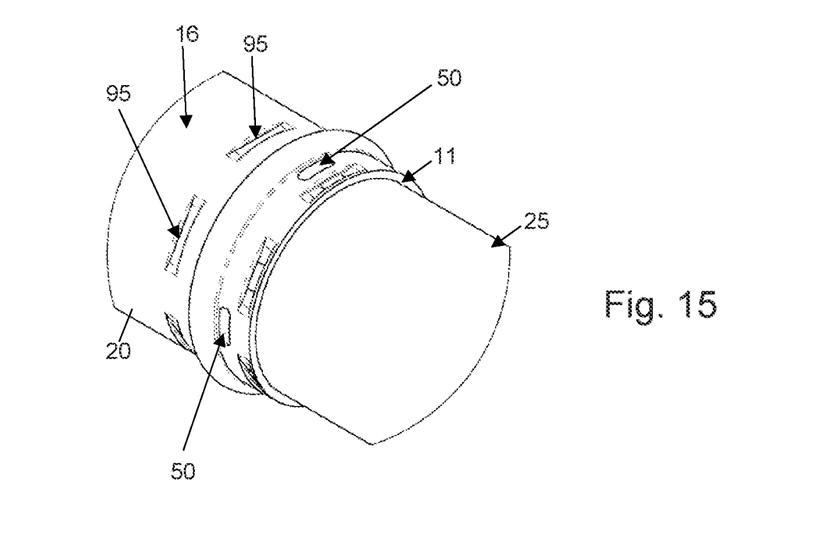
FIG. 15 is a perspective view of a portion of the fitting with pipe inserted of FIG. 14 after compression by a press tool in accordance with embodiments of the present disclosure.
Figure 16:
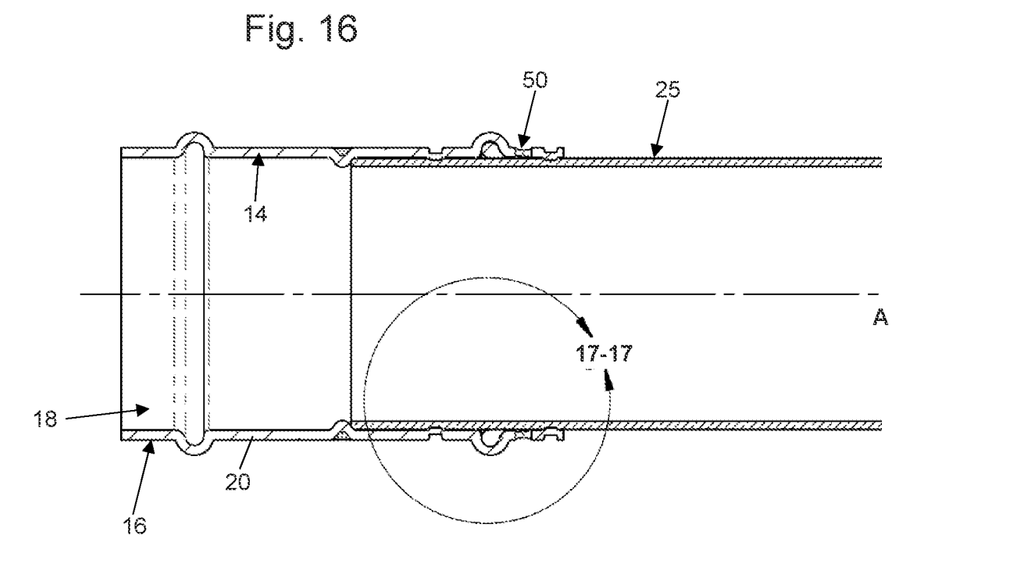
FIG. 16 is a cross-sectional view of a fitting with a pipe inserted and after being compressed by a press tool in accordance with embodiments of the present disclosure.

As shown in FIG. 7, the first compartment 31 of the main body component 20 includes an axially inner segment 30 and axially outer segment 40. The axially inner segment 30 extends a radial distance B from the axis A and the axially outer segment 40 extends different radial distances at different axial locations. For example, the axially outer segment 40 of the main body component 20 can be formed with an indentation 44 and an axially outer floor portion 46 of the interior surface 14, where the radial distance D from the axis A to an inner apex N of the indentation 44 is greater than the radial distance C from the axis A to the axially outer floor portion 46. Further, the radial distance C to the axially outer floor portion 46 is greater than the radial distance B to the axially inner segment 30. In various embodiments, the indentation 44 is generally rounded and asymmetrical to facilitate mating reception of a sealing ring 52 and the operations as described elsewhere herein. The asymmetrical indentation 44 can be seen, for example, in FIG. 9, where radially extending center line L divides the indentation into an axially inner part 47 and an axially outer part 48. The axially inner part 47 includes a first curve K from the interior surface 14 of the axially inner segment 30 of the main body component 20 extending to the inner apex N of the indentation 44, where the axially inner part 47 meets the axially outer part 48. The axially outer part 48 of the indentation 44 extends on a second curve P from the inner apex N of the indentation 44 to the axially outer floor portion 46 of the axially outer segment 40 of the main body component 20. As can be seen in FIG. 9, first curve K is not a mirror image of second curve P. In various embodiments, first curve K is formed with a convex portion M that curves upwardly and a concave portion G, and second curve P is formed with a concave portion R and a convex portion S. As shown in FIGS. 7 through 9, the convex portion M of the axially inner part 47 of the indentation 44 has an axial length Y, and the convex portion S of the axially outer part 48 of the indentation 44 has an axial length Z. According to various embodiments, the axial length Z of the convex portion S of the axially outer part 48 is longer than the axial length Y of the convex portion M of the axially inner part 47 of the indentation 44. Such forms as described herein facilitate mating reception of the sealing ring 52 and operations as described herein. For example, the forming of the main body component 20 according to embodiments as described herein provides a more open surface area for the sealing ring 52 to expand into as one or more pipes or tubes 25 are inserted and clamping pressure is applied, as explained in more detail elsewhere herein.

As referenced above and as shown in FIGS. 7 through 9, the main body component 20 is formed with one or more openings 50, and the openings 50 can be formed in the convex portion S of the axially outer part 48 of the indentation 44 according to various embodiments of the present disclosure. The opening(s) 50 extends from a first axial position 58 to a second axial position 59 along the main body component 20, wherein the first axial position 58 is axially inward of the second axial position 59. In various embodiments, the opening 50 is formed in the convex portion S of the second curve P. Such arrangement facilitates interaction with the sealing ring 52 and operations as described herein.

Figure 17:
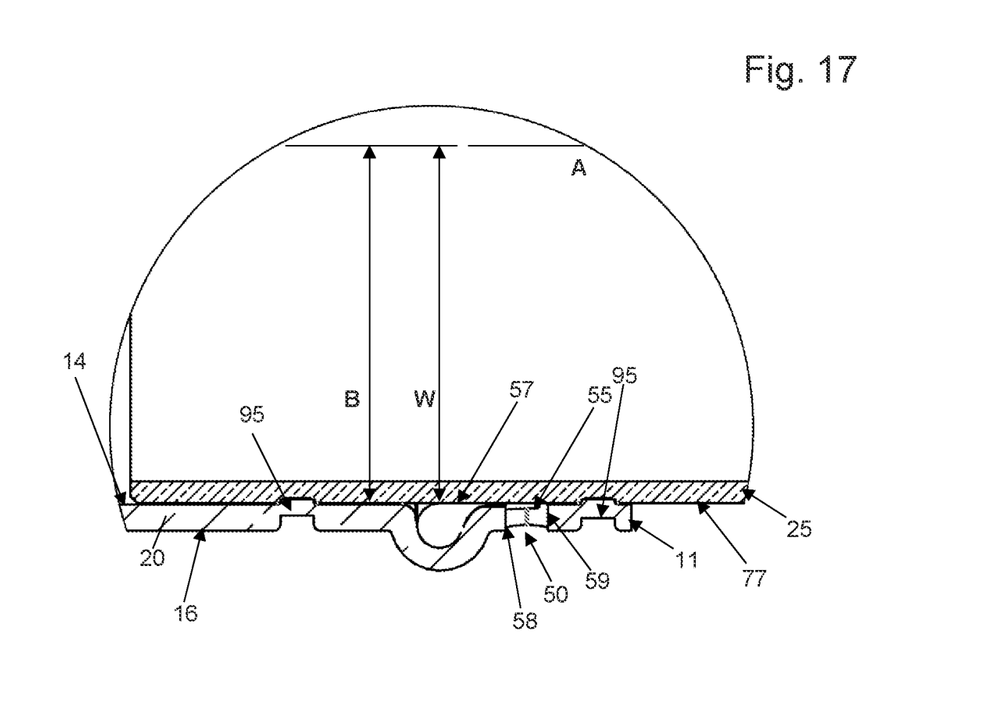
FIG. 17 is a detailed view of encircled portion 17-17 of FIG. 16.

In various embodiments such as shown in FIGS. 3, 5 through 6, 10 through 13, and 16 through 19, the sealing ring 52 can be substantially ring-shaped with a body 53 having a substantially circular cross-section monolithically formed with a wing 54 extending from the body 53 to an outer edge 55. The sealing ring 52 can be formed from a rubber, synthetic or similar non-metallic and compressible material. Optionally, ring 52 can be lubricated with a food grade lubricant, for example, when installed and during use. As shown in FIGS. 5 through 6 and 16 through 19, the sealing ring 52, when installed, is securely maintained within the indentation 44 of the main body component 20. The rounded nature of body 53 and indentation 44 can assist in preventing an inserted pipe 25 from extracting the sealing ring 52 from the cavity 18 during operation. The outer edge 55 of the sealing ring 52 can be positioned to face axially outwardly of the main body component 20 and the outer edge 55 is a portion of the sealing ring 52 that first extends axially outwardly so as to be visible through one or more openings 50 in the main body component 20 upon proper compression of the fitting 10 with a suitable press tool 90, as described elsewhere herein. It will be appreciated that the sealing ring 52 includes surfaces that provide structure to support inter-operation, connection and engaged movement with other surfaces of other components of the present disclosure, as shown and described herein. For instance, the radially interior surface 57 of the sealing ring 52 extends exclusively axially and engages the outer surface 77 of an inserted pipe 25 during operation as shown in FIG. 17. As further shown in FIG. 17, the axially outer edge 55 of the sealing ring 52 lies axially aligned with or axially inwardly of the opening 50 when the sealing ring 52 is at rest and extends axially outwardly of the first axial position 58 of the opening 50 when the sealing ring 52 is compressed.

Figure 19:
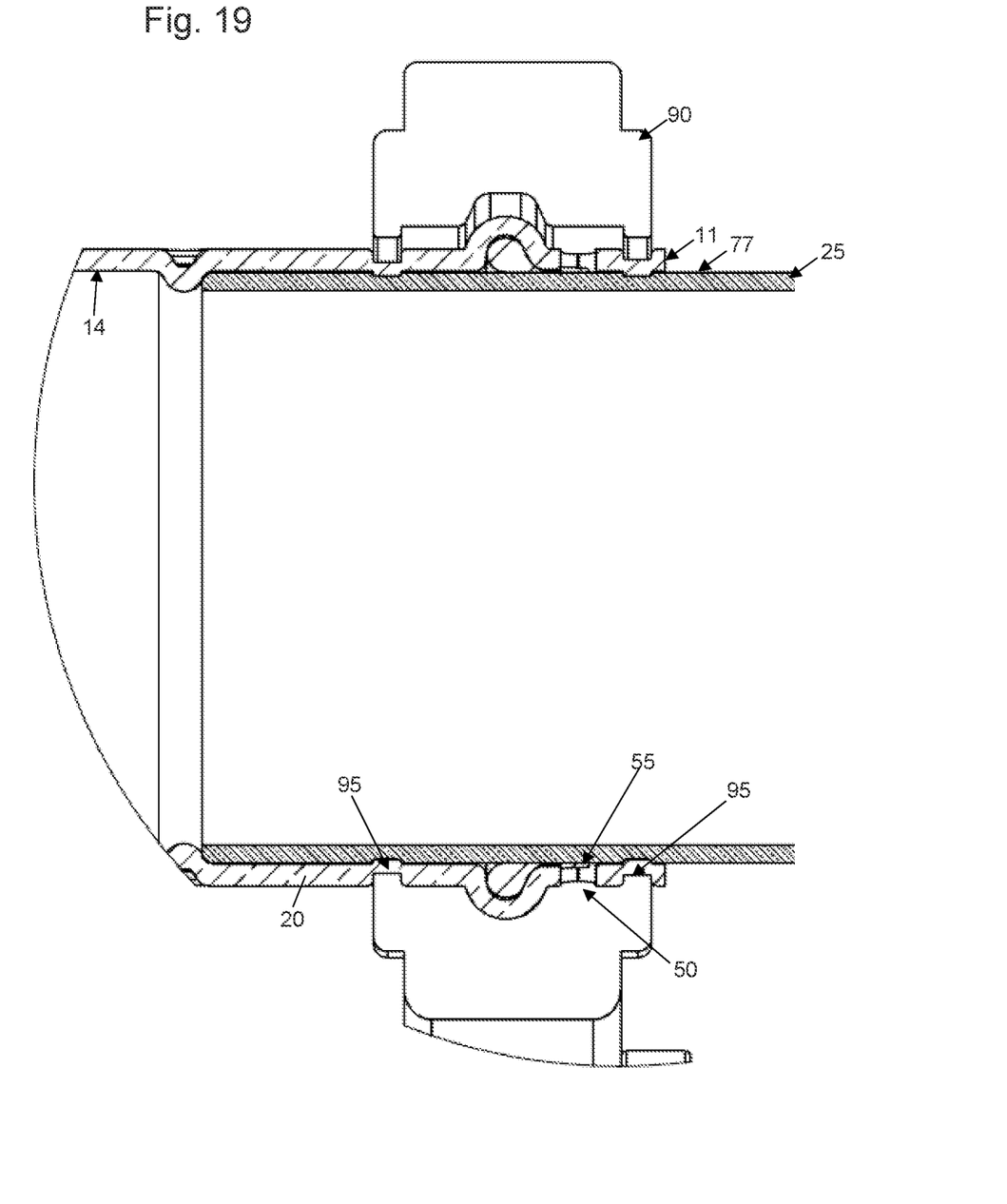
FIG. 19 is a cross-sectional view of the portion of the fitting with pipe inserted of FIG. 18 and after compression by a press tool in accordance with embodiments of the present disclosure.

In various embodiments, when the resilient sealing ring 52 is inserted and retained in the indentation 44 and against the axially outer segment 40 of the interior surface 14 of the component 20, the radial distance W from axis A to the sealing member's radially inner surface 57 is substantially the same as radial distance B, as can be seen in FIG. 17. In various embodiments, the sealing ring axially outer edge 55 lies inwardly of the axially outer edge 11 of the main body component 20 when the sealing ring 52 is at rest (as shown in FIG. 17) and when compressed (as shown in FIG. 19). Further, the sealing ring axially outer edge 55 can lie inwardly of the opening(s) 50 in the main body component 20 when at rest and extends so as to be visible through the opening(s) 50 in the main body component 20 when the sealing ring 52 is compressed, such as when a pipe 25 is inserted during operation as shown in FIGS. 16 through 19, for example.

In operation, as shown in FIGS. 14 through 19, prior to compression of the sealing ring 52, the sealing ring 52 is inserted into the main body component 20 so as to reside within the indentation 44 of the axially outer segment 40 of the main body component 20. A pipe 25 is then inserted into the cavity 18 with little or no resistance from the sealing ring 52, as the pipe outer surface 77 can be of smaller diameter than the diameters of the uncompressed sealing ring 52. In various embodiments, the pipe outer surface 77 can be of substantially the same diameter of the uncompressed sealing ring 52.

As further shown in FIGS. 14 through 19, a press tool 90 such as a tooling jaw can be applied around the outer surface 16 of the main body component 20 when a pipe or tube 25 has been inserted into the cavity thereof. As the press tool 90 is properly applied, the sealing member 52 is drawn into contact with the pipe outer surface 77, as shown in FIG. 19, and the sealing ring 52 is compressed axially outwardly of the indentation 44 so as to be visible through opening 50, as shown in FIG. 19. In various embodiments, the press tool 90 may leave compression marks or indentations 95 in the outer surface 16 of the main body component 20, and the sealing ring 52 is compressed so as to be visible through the opening(s) 50 lying between the compression marks 95. It will be appreciated that the resulting indented portions of the main body component 20 also make contact with the inserted piping element 25 to assist with the seal. In various embodiments, the axially outer edge 55 of the sealing ring 52 extends toward the second axial position 59 of the opening 50 along the main body component 20 but does not reach the second axial position 59. In other embodiments, the axially outer edge 55 of the sealing ring 52 extends to and reaches the second axial position 59 of the opening 50.

It will thus be appreciated that a single application of the press tool 90 about the exterior surface 16 of the main body component 20 acts to compress and/or extrude the sealing ring 52 so as to be visible through the opening(s) 50 of the main body component 20. If the sealing ring 52 is viewable around the entire circumference of the pipe 25, then an individual will know that the fitting has been appropriately pressed and properly sealed.

It will be appreciated that the sealing ring 52 can be of sufficient durometer and have sufficient expandable material in order to appropriately extrude into the area visible through opening(s) 50 when a pipe 25 is inserted, while also filling in any voids, scarring or imperfections in the pipe 25 being inserted as well as in the fitting interior surface 14. The sealing ring 52 can also be of sufficient durometer in order to roll up or pinch when a pipe 25 is improperly inserted, such as when the pipe 25 is inserted at too oblique an angle into the fitting 10.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
    a main body component having interior and exterior surfaces, wherein the interior surface defines a cavity extending through the main body component along an axis, wherein the interior surface comprises an axially inner segment and an axially outer segment, wherein the axially outer segment is formed with an indentation comprising a radial distance from the axis that is greater than a radial distance from the axis to the axially inner segment, wherein the axially outer segment is further formed with an opening extending radially therethrough, wherein the opening is formed at least partially along the indentation; and
    a sealing ring securely maintained within the indentation, wherein the sealing ring comprises an axially outer edge that lies axially aligned with or axially inwardly of the opening when the sealing ring is at rest and lies axially outwardly of the first axial position of the opening when the sealing ring is compressed.

2. The fitting of claim 1, wherein the axially outer segment is formed with the opening extending from a first axial position to a second axial position along the main body component, wherein the first axial position is axially inward of the second axial position.

3. The fitting of claim 1, wherein the indentation is asymmetrical about a radially extending center line.

4. The fitting of claim 1, wherein the indentation comprises an axially inner part and an axially outer part, wherein the axially inner part extends from the axially inner segment on a first curve to an apex of the indentation.

5. The fitting of claim 4, wherein the first curve comprises a convex curve.

6. The fitting of claim 4, wherein the axially outer part of the indentation extends on a second curve from the axially inner part of the indentation to an axially outer floor portion of the axially outer segment of the main body component, and wherein the opening extends through the second curve.

7. The fitting of claim 6, wherein the second curve is not a mirror image of the first curve.

8. The fitting of claim 6, wherein the second curve is formed with a concave portion and a convex portion.

9. The fitting of claim 8, wherein the opening is formed in the convex portion of the second curve.

10. The fitting of claim 4, wherein the axially inner part of the indentation is formed with a convex portion and the axially outer part of the indentation is formed with a concave portion and a convex portion.

11. The fitting of claim 10, wherein the convex portion of the axially inner part of the indentation comprises a convex portion axially inner part axial length, wherein the convex portion of the axially outer part of the indentation comprises a convex portion axially outer axial length, and wherein the convex portion axially outer axial length is longer than the convex portion axially inner part axial length.

12. The fitting of claim 1, wherein the main body component comprises a uniform radial thickness.

13. The fitting of claim 1, wherein the axially outer segment further comprises an axially extending floor portion, and wherein the axially extending floor portion comprises a floor portion radial distance from the axis that is greater than the radial distance from the axis to the axially inner segment.

14. A fitting, comprising:
    a main body component having interior and exterior surfaces, wherein the interior surface defines a cavity extending through the main body component along an axis, wherein the interior surface comprises an axially inner segment and an axially outer segment, wherein the axially outer segment is formed with an indentation comprising an axially inner part and an axially outer part, and wherein the axially outer part is formed with an opening extending radially therethrough, wherein the axially, impart of the indentation extends from the axially inner segment on a first curve to an apex of the indentation and wherein the axially outer part of the indentation extends on a second curve from the apex of the indentation to an axially outer floor portion of the axially outer segment of the main body component, wherein the opening extends through the second curve and wherein the second curve is formed with concave portion and a convex portion; and
    a sealing ring securely maintained within the indentation.

15. The fitting of claim 14, wherein the second curve is not a mirror image of the first curve.

16. The fitting of claim 14, wherein the opening is formed in the convex portion of the second curve.

17. The fitting of claim 14, wherein the axially inner part of the indentation comprises a convex portion axially inner part axial length, wherein the convex portion of the axially outer part of the indentation comprises a convex portion axially outer axial length, and wherein the convex portion axially outer axial length is longer than the convex portion axially inner part axial length.

18. A fitting, comprising:
    a main body component having interior and exterior surfaces, wherein the interior surface defines a cavity extending through the main body component along an axis, wherein the interior surface comprises an axially inner segment and an axially outer segment, wherein the axially outer segment is formed with an indentation comprising a radial distance from the axis that is greater than a radial distance from the axis to the axially inner segment, wherein the axially outer segment is further formed with an opening extending radially therethrough, wherein the opening is formed at least partially along the indentation, wherein the indentation comprises an axially inner part and an axially outer part, wherein the axially inner part of the indentation is formed with a convex portion and extends from the axially inner segment on a first curve to an apex of the indentation, and wherein the axially outer part of the indentation is formed with a concave portion and a convex portion; and B a sealing ring securely maintained within the indentation.

\* \* \* \* \*